(12) United States Patent
Mellick et al.

(10) Patent No.: US 11,490,554 B1
(45) Date of Patent: Nov. 8, 2022

(54) SHOVEL WITH MODIFIED CROSS-BRACING REINFORCEMENT

(71) Applicant: The Mellick Group, LLC., New Canaan, CT (US)

(72) Inventors: Jeffrey Harrison Mellick, New Canaan, CT (US); Beatrice Sophie Mellick, New Canaan, CT (US)

( * ) Notice: Subject to any disclaimer, the term of this patent is extended or adjusted under 35 U.S.C. 154(b) by 489 days.

(21) Appl. No.: 16/139,389

(22) Filed: Sep. 24, 2018

(51) Int. Cl.
  *E01H 5/02* (2006.01)
  *A01B 1/02* (2006.01)
(52) U.S. Cl.
  CPC . *A01B 1/02* (2013.01); *E01H 5/02* (2013.01)
(58) Field of Classification Search
  CPC .............. A01B 1/02; A01B 1/024; E01H 5/02
  USPC ..................... 294/49, 54.5; D8/10
  See application file for complete search history.

(56) References Cited

U.S. PATENT DOCUMENTS

| | | | | |
|---|---|---|---|---|
| 3,549,189 A | * | 12/1970 | Alosi .................. | B25G 1/00 294/57 |
| 4,280,727 A | | 7/1981 | Germain | |
| 4,287,623 A | * | 9/1981 | Tarran .................. | B23D 29/02 7/158 |
| D267,468 S | * | 1/1983 | Simms ................. | 294/49 |
| 4,655,494 A | * | 4/1987 | Eads .................. | A01B 1/02 294/49 |
| D298,205 S | * | 10/1988 | Pollak ................. | D8/10 |
| 4,993,768 A | * | 2/1991 | Ewen .................. | A01B 1/20 238/14 |
| D333,167 S | * | 2/1993 | Guenette ............... | D8/311 |
| 5,419,600 A | | 5/1995 | Tisbo et al. | |

(Continued)

FOREIGN PATENT DOCUMENTS

| | | |
|---|---|---|
| CA | 2137486 A1 | 6/1996 |
| GB | 2248034 B | 12/1994 |

OTHER PUBLICATIONS

Green Plastic Shovel URL:https://www.dreamstime.com/stock-photo-green-plastic-shovel-sunny-beach-image57964407; Mar. 23, 2018.

(Continued)

*Primary Examiner* — Paul T Chin

(57) ABSTRACT

A light-weight shovel for use in varied conditions, which include, for example, sand, soil, snow, gravel, and loose solids of varying kinds. A shovel blade is connected to a first end of a hollow shaft and a hollow handle is connected to a second end of the hollow shaft. In one embodiment, the front side of the shaft is smooth and the rear side is a hollow rectangular shaped channel with rounded edges extending substantially into the blade on the first end and completely into the D-shaped handle in the second end. The hollow channel is reinforced by geometrical structural inlays or ribbing that extends through the entirety of the shovel's handle, shaft, blade's stem, and at least partially into the blade itself. The shovel may be manufactured as a unitary piece in one contiguous design or as a set of interchangeable fitted or interlocking parts that may be coupled with varying components to permit the end user to modify the shovel's configuration to be better adapted for a variety of specific settings and circumstances. The resulting design is a light-weight shovel that provides improved structural strength, integrity, versatility, and maneuverability.

19 Claims, 4 Drawing Sheets

(56) References Cited

U.S. PATENT DOCUMENTS

| | | | | |
|---|---|---|---|---|
| 5,486,027 | A * | 1/1996 | Dionne | A01B 1/022 238/14 |
| 5,585,123 | A * | 12/1996 | Busby | A63H 33/32 294/51 |
| D395,211 | S * | 6/1998 | Linden | D8/10 |
| 5,787,588 | A * | 8/1998 | Tisbo | A01B 1/00 294/54.5 |
| 5,826,930 | A | 10/1998 | Whitehead et al. | |
| 5,951,078 | A | 9/1999 | Whitehead et al. | |
| 5,983,504 | A * | 11/1999 | Tisbo | E01H 5/02 294/54.5 |
| 7,156,435 | B1 * | 1/2007 | Mourelatos | E01H 5/02 294/54.5 |
| D551,524 | S * | 9/2007 | Norton | D8/10 |
| 7,347,276 | B2 * | 3/2008 | Basek | A01B 1/14 16/444 |
| 7,431,358 | B2 * | 10/2008 | Gomes | E05B 1/0053 292/336.3 |
| 7,866,720 | B2 | 1/2011 | Haws et al. | |
| 7,972,227 | B2 * | 7/2011 | Lamson | A63B 60/06 473/513 |
| D717,618 | S * | 11/2014 | Masalin | D8/10 |
| 9,969,366 | B2 * | 5/2018 | Klier | A47L 1/16 |
| D871,888 | S * | 1/2020 | Masalin | D8/107 |
| 2011/0265353 | A1 | 11/2011 | Kaplan | |
| 2014/0338231 | A1 | 11/2014 | Hung et al. | |
| 2015/0123413 | A1 * | 5/2015 | Spataro | B25F 1/02 294/54.5 |

OTHER PUBLICATIONS

Stock photo of horizontal view of a blue plastic toy beach shovel URL: http://www.fotosearch.com/CSP334/k3340102/; Mar. 23, 2018.

* cited by examiner

SHOVEL WITH MODIFIED CROSS-BRACING REINFORCEMENT

FIELD OF THE INVENTION

The present invention relates to a light-weight shovel and more particularly pertains to a device intended to provide the user with all the functionality of any traditional shovel of a similar size, but with a significantly increased maneuverability, versatility, and ease of use and transport, as well as a greater strength-to-weight ratio.

BACKGROUND OF THE INVENTION

Shovels intended to improve versatility and increase shovel strength while reducing overall weight are known in the art. More specifically, compact shovels for scooping myriad solid or semi-solid material and/or a collection of loose objects include certain known configurations.

Hollowing the handle and/or shaft of the shovel, for instance, is well known in the art. The result of such a design is to dramatically reduce the overall weight of the device, as well as the quantity of material necessary for its construction. However, prior art attempts with hollowing out the shaft and/or handle of a shovel have also reduced the shovel's strength and integrity for use in its intended purpose. In turn, the shovel is limited by its innate inability to handle larger, heavier, or more cumbersome materials as compared to a device with shaft and/or handle that is partially hollowed or that has not been hollowed at all. Moreover, structural fatigue may occur over repeated use of such a shovel whose shaft and/or handle have been hollowed out in accordance with prior art attempts at accomplishing the resulting improvements and solutions of the present invention, particularly when used in connection with the movement of heavy or dense objects and substances.

Techniques to improve structural integrity and strength of a shovel include a host of known materials-based solutions. For example, plastic in general has reduced rigidity as compared to steel of equivalent thickness, e.g., acrylonitrile butadiene styrene ("ABS") has an ultimate tensile strength ("MPa") of approximately 40, although plastics with higher tensile strength indices are well known in the art and include substances such as polycarbonate ("PC") having a MPa of approximately 70. Steel is orders of magnitude stronger than plastic, exhibiting MPa's that may exceed 400. Combinations of plastic, graphite, and/or steel have been configured to increase strength-to-weight ratios and reduce the flexing of the blade upon use. Steel, however, is generally heavier and more expensive than plastic. In addition to strength, the maneuverability, versatility and utility of shovels constructed with such combinations are jeopardized by weight imbalances resulting from the integration of the various components and their differing materials of construction.

U.S. Pat. No. 5,419,600 discloses a graphite-impregnated plastic blade reinforced with concavely outwardly extended ribs along the rear end of the blade. The result is improved strength-to-weight ratios and reduced flexion of the blade during use, accomplished by means of a marriage of materials distributed strategically throughout regions of the shovel that most benefit from improved strength and structural integrity.

It is also known in the art that increasing strength-to-weight ratio may be accomplished by means of reinforcing otherwise hollowed out areas of the device by means of creating crisscrossing structures to partially fill these otherwise empty spaces within the device. The result is only a marginal increase in weight while achieving the desired result of improved reinforcement of hollowed areas. In construction, for instance, cross bracing is well known in the art, as in systems to reinforce building structures in which diagonal supports intersect. Cross bracing can increase a building's capability to withstand seismic activity by withstanding lateral forces. Cross bracing typically comprises two diagonal supports intersecting in an X shaped manner; these support compression and tension forces. Depending upon the forces, one brace may be in tension while the other is under compression.

While it is well known in various manufacturing arts that cross bracing may be applied to any rectangular frame structure, such as chairs and bookshelves, existing configurations and orientations, prior attempts have failed to yield a full or satisfactory resolution of the known drawbacks associated with prior art shovels. Indeed, the following summary of the known prior art attempts at solving this issue demonstrates the present invention's necessity and novelty. U.S. Pat. No. 4,280,727 discloses a shovel with a shaft that has been hollowed out in an arcuate shell configuration wherein the back of the shaft is filled by a crisscrossing structure that extends partially through the base of the handle and top of the stem. The prior art discloses arcuate cylindrical configuration of the shaft. Crisscrossing structure is designed around this pipe-like shape. There is no disclosure of crisscrossing structure from a boxed rectangular shaft. Furthermore, the prior art does not disclose incorporating a crisscrossing structure that extends contiguously through the entire rear side of the shaft and into the blade itself, which is a key area where reinforcement allows a shovel blade to maintain structural integrity despite repeated force applied against it. There is no solution provided in the prior art to improve the strength or structural integrity of the base of the stem and its connection to the blade itself by use of a ribbing system.

The region where the base of the shaft connects to the top of the blade is also of importance because it is in this area where the act of shoveling places the most strain on the structural integrity of the device and the location on the shovel most likely to fail or break. The fulcrum point where the typical user of a shovel scoops down, forward, and then upward into a patch of dirt, sand, snow, etc. is offset by the opposite force represented by the weight of the substance being scooped. The greatest stress of flexion of the shovel therefore generally occurs at the point where the shaft meets the blade.

The practical applications of such an improvement over the prior art may be as innocent as helping children gather wet sand on their favorite beach without fear of their shovel bending and breaking in the process. In the alternative, shovels outfitted with the same improved technology may provide critical benefits for a first responder or a member of armed services in the field. Children and adults alike can therefore enjoy improved use of a shovel outfitted with this technology in various sizes and forms since they are configured and outfitted for use on the beach, in the garden, at a campsite, in the snow, or in the field in a military or emergency safety setting.

What is needed in the art is an improved shovel wherein the strength-to-weight ratio is improved not only in a general sense but strategically as well. There exists an unmet need for placing certain design configurations in particular regions within a shovel to most potently improve its overall strength-to-weight ratio while eliminating flexion and consequent failure at points where the shovel experiences the most repeated stress. Moreover, there are additional requirements to provide a more versatile lightweight shovel construction that presents the end user with improved maneuverability and easier transport. In this regard, the present invention overcomes each of these drawbacks.

SUMMARY OF THE INVENTION

The present invention is directed to a lightweight shovel having a handle, shaft, stem and blade all connected in one-piece, in a contiguous fashion. In one embodiment of the present invention, the handle and blade exhibit a rounded box design wherein the length, width, and height of the structure connect at right angles whose edges are slightly rounded off. All but one exposed side of the handle and shaft has an exposed walled off flat face. The rear side of the shaft and handle, however, is filled with a geometrically shaped pattern structure. In an alternate embodiment, the rear side of the shaft and handle is walled off, encasing the geometrically shaped pattern structure that is now housed within.

In one variation of the present embodiment, the geometrically shaped pattern support structure is X-shaped. Regarding the X-shaped crossing structure design (i.e. the hallmark of the preferred embodiment herein described), it is important to understand that various other geometric designs in addition to X-shaped crossing might provide advantages depending upon certain factors relevant to the shovel's construction, including, but not limited to, the contemplated use of the shovel, as well as manufacturing, marketing and sales considerations. For instance, a hexagonal honeycomb configuration might replace the X-shaped crossing structure. Other design examples that may replace or be used partially or in conjunction with the X-shaped crossing structure are, circles, squares, zig zags, and even various ornamental designs such as hearts or flowers, etc.

In one embodiment, the blade is spade-shaped having a central channel comprising the shaft and flanked by two narrower channels. The larger central channel is preferably conical and extends substantially into the length of a spade shaped blade. The cone-shaped central channel is fully filled with a geometrically shaped pattern structures that extend contiguously from the rear end of the handle through the length of the shaft and onward through the central channel extending at least partially into the back side of the blade. The front side of the blade (the scooping portion of the device) exhibits a smooth area hollow area which is partially filled by indentations created by the three aforementioned channels.

In still another version of the present embodiment, the channel, which is filled with geometrically shaped pattern structures, is walled off, thus encasing the geometrically shaped pattern structures that are now housed within. Still further, while blade orientation described in the present embodiment may be preferable for certain applications, the number, size, shape and orientation of the channels may be altered in order to better suit the intended end use far the particular shovel.

The handle, shaft, and blade sit on a linear plane lengthwise on the front side. The rear side of the shovel has a geometrically shaped pattern structure that partially fills the hollow areas of the handle and stem and extends partially through the length of the center portion of the rear-end of the blade itself.

In one embodiment, the shovel comprises a spade shaped blade, a D-shaped handle and a rectangular box-shaped shaft, all formed as a single unit using conventional methods such as injection molding, 3-D printing, and pressure molding. The front side of the shaft and handle is both contiguous whilst the rear side is entirely hollow with X-shaped crossing structure filling out the entire breadth of the hollow area. The X-crossing continues throughout a central channel of the rear side of the blade itself, thereby improving the strength of the shovel.

In another embodiment, the shovel may be designed to be proportionately large or small relative to the intended use. A child on the beach may for instance have a shovel formed from basic ABS or PC. More rugged embodiments may require larger or smaller sizes derived from varied materials and/or combinations of materials such as PC/ABS combinations or steel, wood, graphite, fiberglass, carbon ceramics, carbon fiber, and other materials or combinations of materials well-known in the art.

In yet another embodiment the D-shaped hollow handle may be configured in alternative shapes also well known in the art. For instance, handlebar, rectangular, circular, or even a no-handle format may be contemplated as it relates to the intended use and/or style the manufacturer wishes to make.

In still another embodiment of the present invention, the spade-shaped blade may be reconfigured into a rectangular, spoon-shaped, ovular, paddle-shaped, or any other shape well known in the art. The transverse leading edge of the blade may in the alternative be outfitted with a bifurcated reinforcement strip or another such accoutrement to enhance the ability of the shovel to perform the task for which it is intended.

The present invention has embodiments wherein the shovel may be manufactured as a unitary piece in one contiguous design. Alternatively, the present invention may be manufactured as a set of interchangeable fitted or interlocking shovel components that when coupled with each other provide a complete shovel capable of having varied configurations. Ultimately, the coupled orientation would permit the end user to modify the shovel's configuration to better adapt the shovel for use in a variety of specific settings and circumstances. Whether unitary or the sum of interchangeable components the overall sizes of the shovel, the shape of its handle, shaft, and blade respectively, or even the combination of materials, the present invention presents a lightweight shovel with improved structural strength, integrity, versatility and maneuverability.

BRIEF DESCRIPTION OF THE DRAWINGS

The present invention will now be described, by way of example, with reference to the accompanying drawings, in which.

DETAILED DESCRIPTION OF THE PREFERRED EMBODIMENTS

Figure 1:
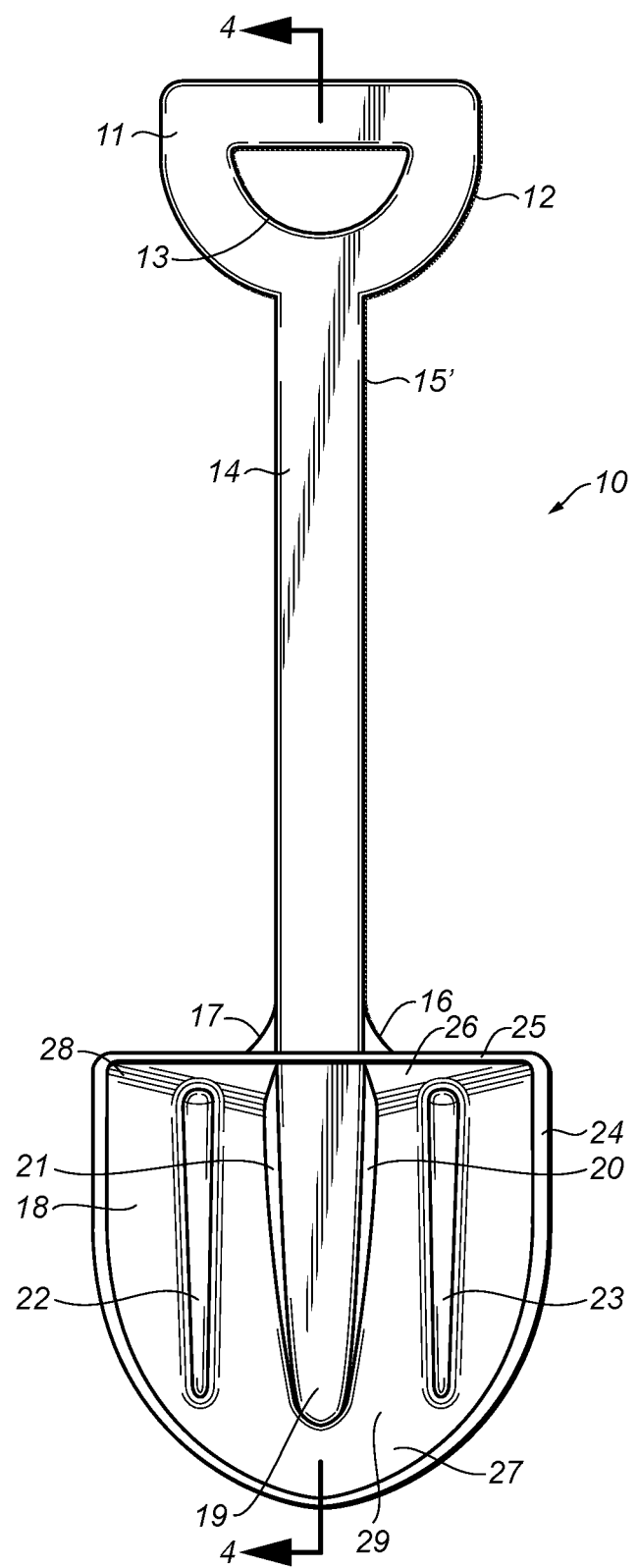
FIG. 1 is a front side longitudinal plan view of a shovel in accordance with the present invention.

Although the invention will be described in terms of a specific embodiment, it will be readily apparent to those skilled in the art that various modifications, rearrangements, and substitutions may be made without departing from the spirit of the invention.

Directional phrases used herein, such as, for example, clockwise, counterclockwise, left, right, top, bottom, upwards, downwards, front, rear, leading, trailing, and derivatives thereof, relate to the orientation of the elements shown in the drawings and are not limiting upon the claims unless expressly recited therein. It is noted that such directional phrases further relate to the position of the shovel in space as it is being used. As an illustrative example, the leading edge of the blade is the edge opposite the handle.

Referring now to FIGS. 1-4, a front side of shovel 10 includes a handle 11, a shaft 14, and a blade 18. Handle 11 is configured to be split symmetrically by a longitudinal axis 4 for shovel 10 as well as blade 18 and shaft 14.

Handle 11, in an exemplary embodiment, includes a D-shaped grip 13, the edges of handle 11 being rounded at each if its corners 12. In the exemplary embodiment, the length of handle 11 from its leading to its trailing edge is approximately 3.7 inches and the width of handle 11 at its peripheral outer edges is approximately 5.3 inches. The length of the empty space created by the D-shaped grip from its leading to its trailing edge at its longest points apart is approximately 1.5 inches, and the width of the empty space at its longest points apart is approximately 3.1 inches.

Handle 11 and shaft 14 are contiguous and connected as one-piece in the exemplary embodiment shown. The front surfaces of handle 11 and shaft 14 lie flat along the XY plane represented by the 2-dimentional FIG. 1. Each of the edges of shaft 14 are rounded off at the shaft corners 15. As shaft 14 extends downwards and connects contiguously with blade 18 there exist one right flanking webbing 16 and one left flanking webbing 17 at the nexus between shaft 14 and blade 18. Left flanking webbing 17 and right flanking webbing 16 are identical mirror image pieces, respectively.

Shovel 10 is formed as a single piece wherein handle 11, shaft 14, and blade 18 taken together are fused and contiguous, as by being made from a single mold and of a material such as ABS.

Blade 18 comprises a curved portion 27, a right flanking webbing 16, and a left flanking webbing 17 that bookend central channel 19. Lateral walls 26 are flat and extend at an oblique angle creating a cavity 29 where curved portion 27 and lateral walls 26 meet at front side trenches 28 of blade 18. Blade 18 includes three curved protrusions, one central channel 19, and a right flanking channel 23 and a left flanking channel 22 formed as mirror images. Right flanking channel 22 and left flanking channel 23 are rounded protrusions extending out from blade 18 base and cavity 29. Right flanking channel 22 and left flanking channel 23 each have a leading and trailing edge which are both tapered as they extend downward from the leading to the trailing edges of each channel 22 and 23, respectively. Central channel 19 also protrudes out from blade 18 and cavity 29, having a left flat wall 21 and a right flat wall 20 that extend into blade 18 and cavity 29. The face of central channel 19 has a flat outwardly protruding edge. The trailing end of central channel 19 is tapered as it extends away from the leading edge of central channel 19. Blade 18 has a leading-edge lip 25 which consists of rounded edges, and has downward left and right edges 24 that converge at the base and trailing edge of blade 18. Left and right edges 24 have a flat face as opposed to the rounded edges of the leading-edge lip 25.

Figure 2:
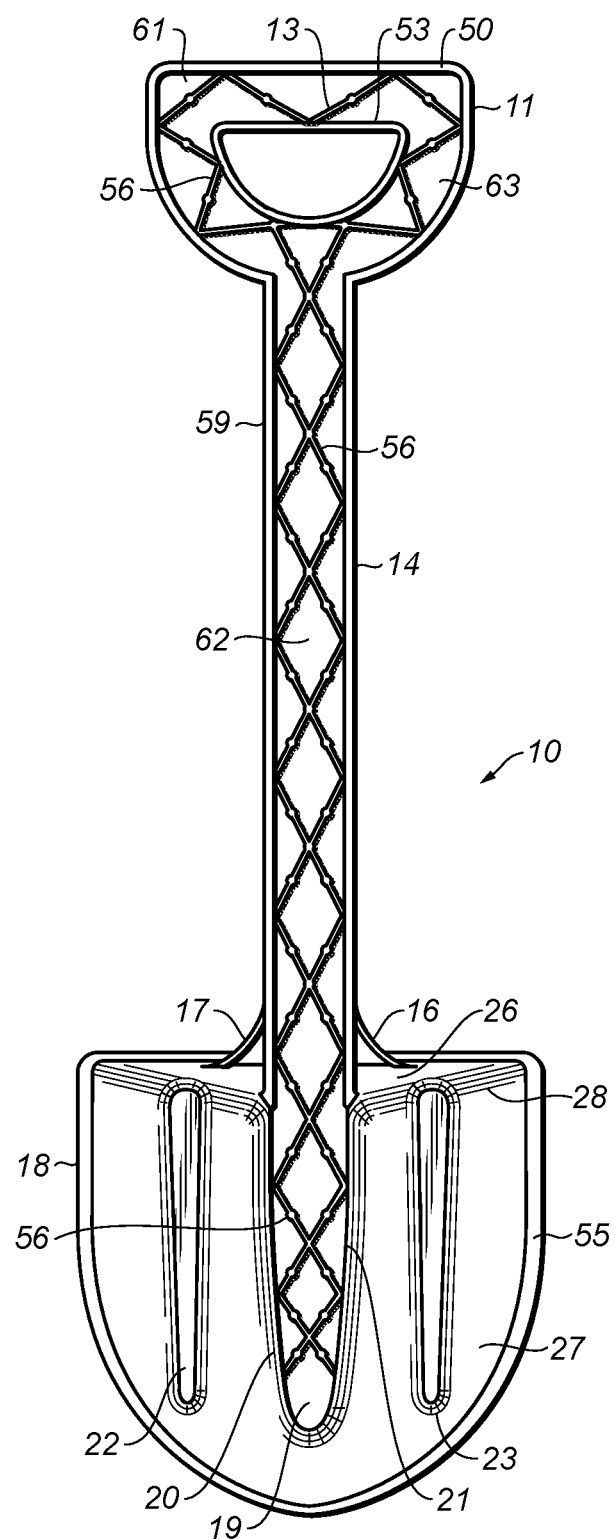
FIG. 2 is a back side longitudinal plan view of a shovel in accordance with the present invention.

Referring now to FIG. 2, a rear side of shovel 10 includes handle 11, shaft 14, and blade 18. Handle 11, in an exemplary embodiment, includes D-shaped grip 13. The rear side of D-shaped grip 13 has continuous rounded handle edges 53, as do the entire outer edges. The rear side of the shovel 10 is hollow. The rear side of shovel 10 has a rear side of handle 11 which has an inner wall 63. This inner wall 63 lies flat and depressed inside the planar surface of the layout seen here in FIG. 2. The rear side of the shaft 14 is also hollow and sits flat and exactly along the same plane as the inner wall 63 of the handle 11.

Handle 11 is hollow and outfitted with X-crossing structure 56 whose ridges zig and zag throughout the hollow space of the rear side of the handle 11. For purposes of example only, in one embodiment of the present invention, the thickness of the walls of the X-crossing structure 56 is 0.08 inches plus or minus approximately 0.01 inches. This X-crossing structure 56 has at the midpoint of each individual ridge throughout the rear side of shovel 10 a cylindrical shaped chord 61. Chords 61 bisect each wall created by the contiguous X-crossing structure 56. The radii of each of the chords 61 that bisects each wall of the X-crossing structures is approximately 0.14 inches plus or minus approximately 0.01"

The rear side of shaft 14 is also hollow and outfitted with X-crossing structure 56 whose ridges zig and zag throughout the hollow space of the rear side of the shaft 14. The angles with which the zig zagging x-crossing structure bisect creates approximately 30 and 60 degrees angles therewith.

The rear outer edge of the shaft 11 of shovel 10 also has rounded edges 59 which occur at the same size and scope as the outer edges 50 of the rear side of handle 11. The area where the hollow rear side of the shaft 14 extends downwards and connects contiguously with blade 18 there also exist one right flanking webbing 16 at the *nexus* between right part of the shaft 14 and the blade 18. The left flanking webbing 17 and the right flanking webbing 16 are identical mirror image pieces respectively. Note that that the left flanking webbing 17 is on the right side of the rear side of shovel 10 as shown in FIG. 2. The right flanking webbing 16 is on the left side of the rear side of shovel 10 as shown in FIG. 2. The reason for this discrepancy is the fact that the display of shovel 10 as seen in FIG. 2 is its rear side.

The rear side of shovel 10 displays the rear side of blade 18. The blade 18 is comprised of a rear side curved portion 27, a right flanking webbing 16 and a left flanking webbing 17 that bookend the central channel 19. The rear side of lateral walls 26 are flat and extend out toward the viewer at an oblique angle. The rear side of the lateral walls 26 meet the rear side of the curved portion 27 of the blade 18 at angled blade ridges 18 at rear side trenches 28. The blade 18 includes three curved protrusions, one central channel 19 (here in FIG. 2 shown in the rear side of blade) and a right flanking channel 23 and a left flanking channel 22 (here shown as indented channels on the rear side of blade 18). The rear side of right flanking channel 22 and the rear side of left flanking channel 23 are mirror images, identical in size and scope. The rear side of right flanking channel 22 and the rear side of left flanking channel 23 are rounded channels extending inside from the blade 18 base. The rear side of right flanking channel 22 and the rear side left flanking channel 23 each have a leading and trailing edge which are both tapered as they extend downward from the leading to the trailing edges of each channel 22 and 23 respectively. The rear side of central channel 19 is hollow. It has a rear side left flat wall 21 and a rear side right flat wall 20 that extend into the hollow central channel 19 of blade 18. The trailing end of the central channel 19 is tapered as it extends down away from the leading edge of the central channel 18. The entire hollow rear side of central channel 19 is crisscrossed by X-crossing structure 56.

Figure 3:
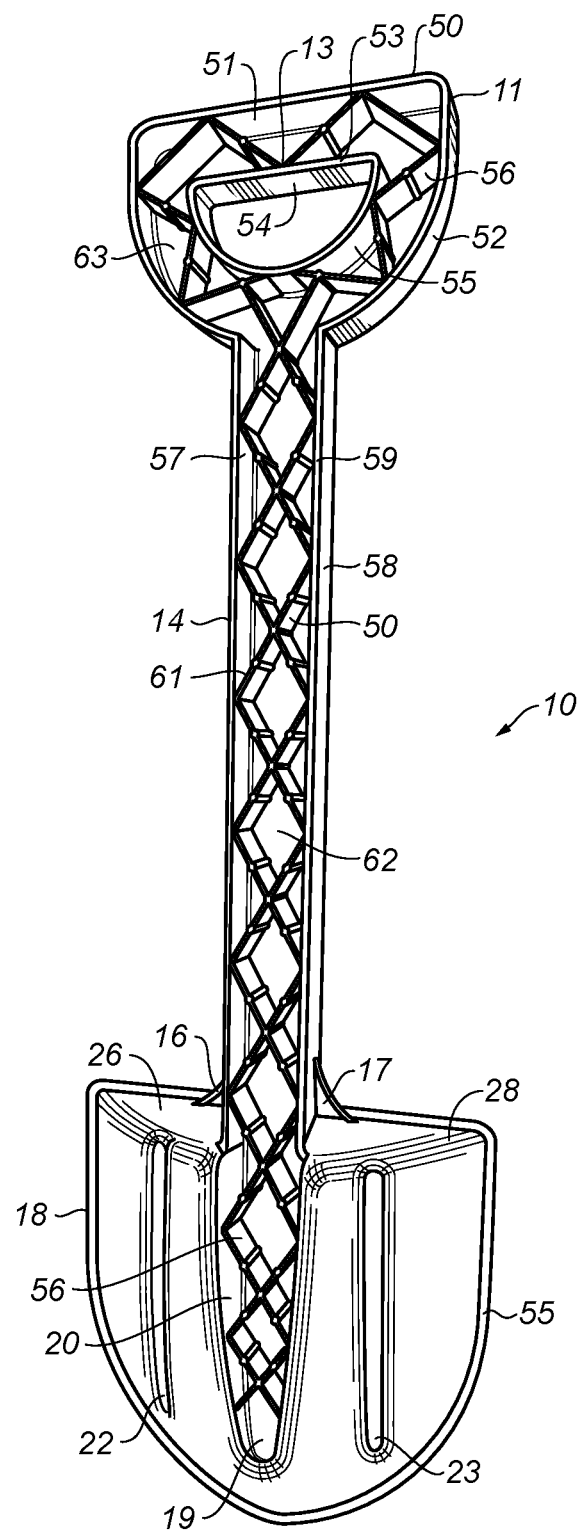
FIG. 3 is a perspective longitudinal plan view of the back side shown in FIG. 2.

FIG. 3 is a diagonal perspective view of the rear side of shovel 10. Contiguous and one-piece rear side of shovel 10 includes a handle 11, a shaft 14 and a blade 18. The handle 11, in an exemplary embodiment includes a D-shaped grip 13. The rear side of the D-shaped grip 13 has continuous rounded handle edges 53. The entire outer edges of the rear side of the handle 11 have rounded edges 50. The rear side of the shovel 10 is hollow. The rear side of handle 11 which has an inner wall 63. This inner wall 63 lies flat and depressed inside the planar surface of the layout seen here in the perspective, diagonal viewpoint of FIG. 3. The rear side of the shaft 14 is also hollow and sits flat and exactly along the same plane as the inner wall 63 of the handle 11.

Handle 11 is hollow and outfitted with X-crossing structure 56 whose ridges zig and zag throughout the hollow space of the rear side of the handle 11. This zig zagging X-crossing structure 56 has at the midpoint of each individual ridge throughout the rear side of shovel 10 a cylindrical shaped notch 61. Notch 61 bisects each wall created by the contiguous X-crossing structure 56. The perspective viewpoint of the rear side of shovel 10 reveals the width of the inner wall 51 of handle 11 as well as the outer wall 52 of handle 11. Moreover, the perspective viewpoint of FIG. 3 provides a display of the inner wall 54 of the D-shaped handle 13 and the outer wall 55 of the same.

The rear side of shaft 14 is also hollow and outfitted with X-crossing structure 56 whose ridges zig and zag throughout the hollow space of the rear side of the shaft 14. The rear outer edge of the shaft 11 of shovel 10 also has rounded edges 59 which occur at the same size and scope as the outer edges 50 of the rear side of handle 11. The perspective viewpoint of the rear side of shovel 10 reveals the width of the inner wall 57 of shaft 14 as well as the outer wall 58. The area where the hollow rear side of the shaft 14 extends downwards and connects contiguously with blade 18 there also exist one right flanking webbing 16 at the *nexus* between right part of the shaft 14 and the blade 18. The left flanking webbing 17 and the right flanking webbing 16 are identical mirror image pieces respectively. Note that that the left flanking webbing 17 is on the right side of the rear side of shovel 10 as shown in FIG. 3. The right flanking webbing 16 is on the left side of the rear side of shovel 10 as shown in FIG. 3. The reason for this discrepancy is the fact that the display of shovel 10 as seen in FIG. 3 is its rear side.

The rear side of shovel 10 displays the rear side of blade 18. The blade 18 is comprised of a rear side curved portion 27, a right flanking webbing 16 and a left flanking webbing 17 that bookend the central channel 19. The rear side of lateral walls 26 are flat and extend out toward the viewer diagonally and at an oblique angle. The rear side of the lateral walls 26 meet the rear side of the curved portion 27 of the blade 18 at angled blade ridges 18 at rear side trenches 28. The blade 18 includes three curved protrusions, one central channel 19 (here in FIG. 2 shown in the rear side of blade) and a right flanking channel 23 and a left flanking channel 22 (here shown as indented channels on the rear side of blade 18). The rear side of right flanking channel 22 and the rear side of left flanking channel 23 are mirror images, identical in size and scope. The rear side of right flanking channel 22 and the rear side of left flanking extend inside from the blade 18 base. The rear side of right flanking channel 22 and the rear side left flanking channel 23 each have a leading and trailing edge which are both tapered as they extend downward from the leading to the trailing edges of each channel 22 and 23 respectively. The rear side of central channel 19 is hollow. It has a rear side left flat wall 21 and a rear side right flat wall 20 that extend into the hollow central channel 19 of blade 18. The trailing end of the central channel 19 is tapered as it extends down away from the leading edge of the central channel 18. The entire hollow rear side of central channel 19 is crisscrossed by X-crossing structure 56.

Figure 4:
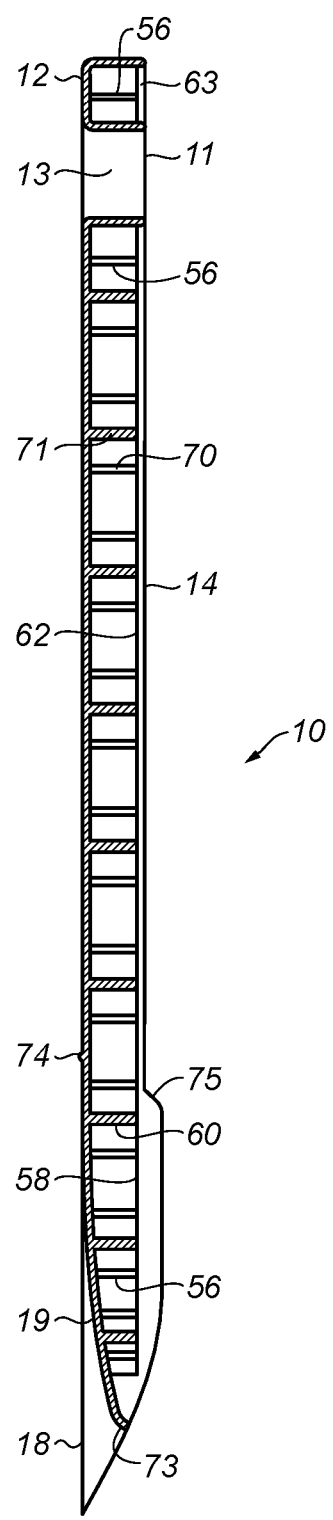
FIG. 4 is a longitudinal cross-sectional view taken along line 4-4 in FIG. 1.

FIG. 4 is a longitudinal cross-section of the right side of shovel 10 cut at its mid-line. Shovel 10 includes a handle 11, a shaft 14 and a blade 18. The cross-sectional cut side-view angle shows that handle 11, shaft 14 and blade 18 are contiguous and one-piece in this exemplary embodiment. The thickness of the exemplary embodiment shown in FIG. 4 is constant from the trailing end of the handle 11 down through the trailing end of the shaft 14. That thickness is approximately 1 inch. The unshaded whit area near the trailing end of the handle 11 revels the area encompassed by the whole created by the D-shaped grip. Horizontal shaded areas 71 reveal areas where the X-crossing zig zag pattern 56 meet the edge of the inner walls of shovel 10. Thinner unshaded horizontal lines 70 indicate areas where the X-crossing zig zag pattern converge at the center midline of shovel 10. FIG. 4 displays the largely vertical, ramrod nature of the exemplary embodiment of shovel 10. Handle 11 and shaft 14 are straight with no curvature whatsoever. At the point where the shaft 14 meets the blade 18 there exists a short ridge 74 which outlines the top of the central channel 19. A hollow dip 75 extends in the exemplary embodiment approximately 0.30 inches past the rear edge of the shaft 14 leading of blade 18 provides some area for the shovel 10 to do the work of shoveling by providing depth for a concave surface inside in the front of blade 18. Central channel 19 curves down to the rear body of the blade 18. The elongated nose at the trailing end of channel 19 meets the body of the blade 18 without reaching the trailing end tip of blade 18 at the absolute bottom of the shovel.

Those skilled in the art of creating reinforcing structure designs in furniture, tools, implements and the like may contemplate various configurations that mimic the functionality of the X-crossing structure 56 herein described in detailed in the primary embodiment. Various geometric designs and/or ornamental configurations may be contemplated as an alternative to the X-crossing structure 56. For instance, a skilled artisan may choose a hexagonal design, X-crossing that bisect at 90 degree angles. Perhaps even a quasi-functional ornamental design that mimics flower petals, stars or some other such artistic expression as a replacement for the X-crossing structure 56.

While specific embodiments of the invention have been described in detail, it will be appreciated by those skilled in the art that various modifications and alternatives to those details could be developed in light of the overall teachings of the disclosure. Accordingly, the arrangements disclosed are meant to be illustrative only and not limiting as to the scope of invention which is to be given full breadth of claims appended and all equivalents thereof

What is claimed is:

1. A shovel comprising:
    a) a blade joined to a first end of a non-collapsible shaft and a handle joined to a second end of said non-collapsible shaft;
    b) a continuous channel extending throughout said handle and said non-collapsible shaft; and
    c) at least one X-crossing structure formed inside and attached to said continuous channel throughout said handle and said non-collapsible shaft.

2. The shovel of claim 1 wherein said continuous channel extending throughout said handle and said non-collapsible shaft additionally extends into at least a part of said blade.

3. The shovel of claim 2 wherein said continuous channel extending throughout said handle and said non-collapsible shaft and additionally extending into at least a part of said blade further includes at least one additional channel formed in said blade.

4. The shovel of claim 1 wherein said at least one X-crossing structure formed inside and attached to said continuous channel is fully housed with said channel.

5. The shovel of claim 1 wherein said at least one X-crossing structure formed inside and attached to said continuous channel is exposed on at least one side.

6. The shovel of claim 1 wherein said handle is D-shaped.

7. The shovel of claim 1 wherein said blade is spade shaped.

8. The shovel of claim 1 wherein said non-collapsible shaft is rectangular shaped.

9. The shovel of claim 1 wherein said at least one X-crossing structure further includes cylindrical chords at the mid-point of each section of said at least one X-crossing structure.

10. The shovel of claim 1 wherein said shovel is constructed as one unitary piece.

11. A shovel comprising:
a) a blade joined to a first end of a non-collapsible shaft and a handle joined to a second end of said non-collapsible shaft;
b) a continuous channel extending throughout said handle and said non-collapsible shaft that further extends into at least a part of said blade; and
c) at least one X-crossing structure formed inside and attached to said continuous channel throughout said handle, said non-collapsible shaft, and said blade.

12. The shovel of claim 11 wherein said at least one X-crossing structure formed inside and attached to said continuous channel extends into at least a part of said blade.

13. The shovel of claim 11 wherein said at least one X-crossing structure formed inside and attached to said continuous channel is exposed on at least one side.

14. The shovel of claim 11 wherein said at least one X-crossing structure formed inside and attached to said continuous channel is fully housed within said channel.

15. The shovel of claim 11 wherein said handle is D-shaped.

16. The shovel of claim 11 wherein said blade is spade shaped.

17. The shovel of claim 11 wherein said non-collapsible shaft is rectangular shaped.

18. The shovel of claim 11 wherein said shovel is constructed as one unitary piece.

19. The shovel of claim 11 wherein said at least one X-crossing structure further includes cylindrical chords at the midpoint of each section of said at least one X-crossing structure.

* * * * *